United States Patent [19]
Reichert

[11] 4,204,100
[45] May 20, 1980

[54] ANTI-THEFT SWITCH FOR VEHICLES

[76] Inventor: Dieter Reichert, Bismarckstr.49, Gartringen, Fed. Rep. of Germany

[21] Appl. No.: 850,931

[22] Filed: Nov. 14, 1977

[30] Foreign Application Priority Data

Dec. 8, 1976 [DE] Fed. Rep. of Germany ....... 2655660

[51] Int. Cl.$^2$ ............................................. H01H 3/16
[52] U.S. Cl. ............... 200/52 R; 200/61.44; 200/161; 340/65; 340/568
[58] Field of Search ........... 200/61.44, 61.93, DIG. 8, 200/52 R, 52 A, 153 F, 161; 340/63, 65, 540, 548, 568, 570–572, 537; 180/114

[56] References Cited

U.S. PATENT DOCUMENTS

| | | | |
|---|---|---|---|
| 1,528,423 | 3/1925 | Heyne | 340/63 |
| 2,722,575 | 11/1955 | Dobkins | 200/52 R |
| 3,422,398 | 1/1969 | Rubin | 340/63 X |
| 3,634,635 | 1/1972 | Ellis | 200/52 R |
| 3,800,279 | 3/1974 | Thompson | 200/61.44 X |
| 3,821,504 | 6/1974 | Schomaker et al. | 200/52 R |
| 4,040,008 | 8/1977 | Sunabria | 340/65 |

FOREIGN PATENT DOCUMENTS

1181782 11/1964 Fed. Rep. of Germany ........... 200/161

*Primary Examiner*—James R. Scott
*Attorney, Agent, or Firm*—Marshall & Yeasting

[57] ABSTRACT

An anti-theft device for a vehicle that is movably mounted on wheel carriers, for securing the vehicle against theft of wheels and against unauthorized towing, which comprises an alarm switch and an actuating member, one of which is mounted in a fixed position relative to the vehicle, and the other of which is mounted to move with one of the wheel carriers. The actuating member is arranged to actuate the switch, and has sufficient lost motion relative to the switch to accommodate normal relative movement of the vehicle and the wheel carrier during travel of the vehicle. The switch is actuated by relative motion of the switch and actuating member in excess of lost motion when the vehicle is raised for towing or for removal of a wheel.

6 Claims, 5 Drawing Figures

ANTI-THEFT SWITCH FOR VEHICLES

BACKGROUND OF THE INVENTION

The invention relates to a device for securing a vehicle against theft of wheels as well as against unauthorized towing away.

Various anti-theft devices for vehicles are known which trip an alarm in the event of the improper opening of vehicle doors, of the trunk or of the hood, if the ignition is switched on by an unauthorized person. These known types of anti-theft devices are usually put in a state of alarm readiness by locking the vehicle door after leaving the vehicle; the parts of the vehicle to be given special protection are in general provided with contact switches which are actuated when manipulated by unauthorized persons.

Heretofore it has been a problem to secure vehicles against theft of wheels as well as against unauthorized towing away, since the above-mentioned anti-theft devices of the known type do not respond in these cases.

SUMMARY OF THE INVENTION

It is an object of this invention to provide a device for securing motor vehicles against theft of wheels as well as against unauthorized towing away, the device being highly effective and of simple construction.

According to the invention, this object is attached by positioning a switch, which is part of an anti-theft system equipped with an alarm, as well as a movable member for actuating the switch, in such a manner between the automobile body, or the chassis, and a wheel support that the movable actuating member exhibits sufficient dead movement with respect to the switch during normal operation of the vehicle. The switch is tripped in the event of the distance between the car body or chassis and the wheel support being extended to an unusual degree.

If a vehicle equipped with a device according to this invention has one of its sides, or its front or rear end, raised in any manner whatsoever; for example, by means of a jack for lifting vehicles, a winch or the like, then the distance between the automobile body or chassis and the wheel supports increases beyond that which occurs in normal operation, and this results in the movable actuating member tripping the switch and hence actuating the alarm. On the other hand, during normal operation of the vehicle, the movable actuating member has sufficient dead motion with respect to the switch to the switch so that the switch is not actuated inadvertently. The anti-theft principle of the present invention can be implemented either with a mechanically actuated switch or with a magnetically tripped switch.

Thus in one embodiment of the invention, a resilient member is positioned between the automobile body or chassis and the wheel support, the resilient member being in association with the switch as well as with a connecting member that constitutes the movable actuating member for the switch, the arrangement being such that the connecting member first travels through an idle path when the distance between the automobile body or chassis and the wheel support is enlarged to an unusual degree, and then trips the switch, whence the spring member flexibly takes up yet a further increase in the distance. Such an anti-theft device consists of a few simple parts and is distinguished by its very robust and easily assembled construction.

In a second embodiment of the invention, a magnetic proximity switch; for example, a reed relay, is actuated by a movable actuating magnet that is connected with the wheel support. Here it is expedient to position the actuating magnet next to the switch in such a manner that there is sufficient dead motion allowed for normal vehicle operation.

DESCRIPTION OF THE PREFERRED EMBODIMENTS

Figure 1:
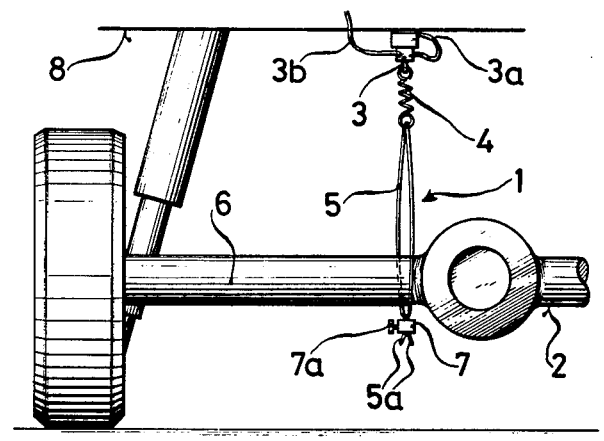
FIGS. 1 to 4 are: diagrammatic views of four practical mechanical switch embodiments of the device according to the invention.

In the embodiment of the invention depicted in FIG. 1, the anti-theft device 1 is secured to a vehicle having a rigid rear axle 2 of which the one essential half is illustrated. The anti-theft device 1 comprises an electrical switch, which in this case takes the form of a pull swtich 3, a resilient member in the form of a tension spring 4 which is cased in at the lower end of the switch, as well as a connecting member that is depicted as a flexible cable 5 hung as a loop. The looped cable 5 is pushed through the lower eye of the tension spring 4 and is passed around the axle tube 6 approximatey at the centre of the rear axle 2. The two free ends 5a of this cable 5 are firmly joined together at the bottom by means of a common screw nipple 7. The screw nipple 7 is adjusted so that the rigid rear axle 2 can travel over a specific idle path when subjected to upward and downward movement (spring suspension) during normal operating conditions without the connecting cable 5 being able to trip the switch 3, which is secured to the vehicle body 8. On the other hand, the switch 3 is tripped by the connecting cable 5 when the distance between the automobile body 8 and the rear axle 2 is increased to an extent that is greater than that which prevails during normal operation, as is the case when lifting the body for the purpose of removing a wheel or towing.

As can be recognized, the anti-theft device 1 according to the invention can be simply adapted to any vehicle type by moving the screw nipple 7 on the connecting cable 5 upwards or downwards after slackening screw 7a, and then tightening it again, whereby an appropriate lengthening or shortening of the cable loop can be attained according to the vehicle type. The electrical pull swtich 3 preferably has normally open contacts and is connected to one cable 3a for grounding and to a second cable 3b for the anti-theft installation (not shown) such as an anti-theft device for the trunk.

The tension spring 4 between the cable 5 and the pull switch 3 can flexibly take up a further extension of the distance between the body 8 and the rear axle 2 after the pull switch 3 has been actuated so that the pull switch is not unduly subjected to strain; accordingly, the tension of the spring 4 is adjusted correspondingly.

Figure 2:
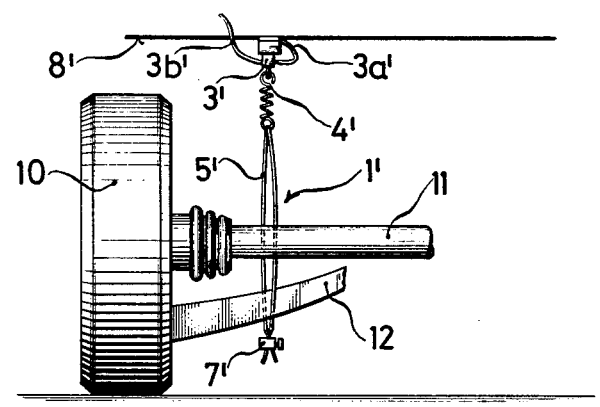

FIG. 2 shows an anti-theft device 1' according to the invention which is similar to that in the previous example, and the corresponding parts of this appliance are therefore marked with the same reference symbols with the addition of a prime mark; detailed description of these parts can, therefore, be omitted.

The difference between FIG. 2 and FIG. 1 is to be seen in the fact that in the construction according to FIG. 2 the anti-theft device 1' is employed with a vehicle having single wheel suspension. In this embodiment, the electrical pull switch 3' can be attached to the body 8'. The point of attachment here is chosen so that the device 1' is allocated to a single wheel 10—in contrast to the previous embodiment wherein the wheel 10 is driven by a driving shaft 11 and mounted on a traverse link 12.

The looped connecting cable 5' in this case has its lower free end wound around the traverse link 12 supporting the wheel 10. The screw nipple 7' which is pushed over the cable ends onto the cable 5' is likewise fixed with consideration given to the necessary idle path for normal operating conditions.

Figure 3:
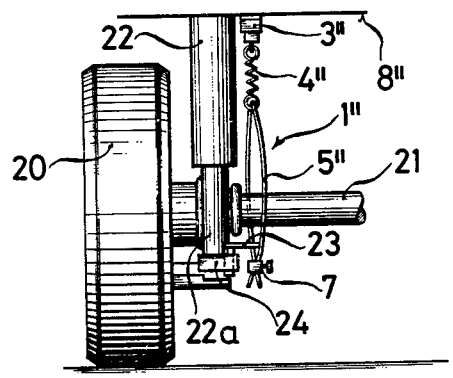

In the embodiment of the invention illustrated in FIG. 3, the anti-theft device 1" is provided for a vehicle having a rear engine drive, whereby the wheels of the vehicle may again be individually suspended, with each single wheel 20 having one anti-theft device 1" allocated to it.

As can be seen from FIG. 3, in this embodiment an axle tube 21 and the wheel 20 are carried by a shock absorber 22 which in turn is mounted on a self-supporting vehicle body 8". A stop bracket 23 is attached to the lower end 22a of the shock absorber 22 with the aid of a retaining clip 24. The stop bracket 23 may be ring shaped at its end to accommodate one end of the looped connecting cable, while the other cable end is passed around the outside. The cable ends are then once again connected together with the aid of a screw nipple 7" so that the necessary idle path is provided during normal operation. The connecting cable rope provided between the tension spring and the point of connection with the rear axle or the wheel carrier does not have to be designed as a loop in the three embodiments of the invention that have previously been described. Often it is sufficient to provide a simple, flexible cable which is connected at its upper end to the tension spring, while the lower end is passed through an appropriately sized hole in the retaining angle plate mounted at the point of connection of the rear axle or the wheel carrier, whereby a screw nipple or an appropriate setscrew is fixed at the lower free end while maintaining the necessary idle path.

In the three examples of mounting that have been given in FIGS. 1 to 3 for the anti-theft device according to the invention, it is also possible to replace the flexible connecting cable with a linkage system. The lower end of this linkage can be expediently led through a stop bracket secured to a wheel carrier, while making allowance for the idle path which can be adjusted to the required length by means of a setscrew. In the case of a vehicle with a rigid rear axle (FIG. 1), this stop bracket can be attached at the central area of the rear axle, and preferably to the housing of the differential gearing, while in the case of a vehicle having individually suspended wheels as in FIGS. 2 and 3 it can be affixed to the traverse link (see FIG. 2) or at the lower end of the shock absorber (see FIG. 3). In this case it is expedient to provide the upper end of the linkage with a tension spring connection, which in turn is attached to the switch member on the electric switch mounted on the automobile body.

Figure 4:
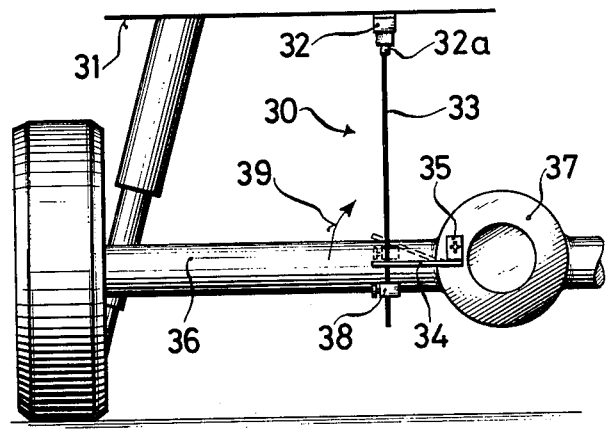

In conclusion, FIG. 4 depicts another embodiment of the invention having a connecting member in the form of a linkage system, this being an example of an assembly in the case of a vehicle having a rigid rear axle.

The anti-theft appliance 30 according to the invention as shown in this embodiment comprises a pull switch 32 that is secured to the automobile body 31, a rigid linkage system 33 and a flat spring 34, which at the same time constitutes the resilient member of the anti-theft device 30 as well as the arm of a stop bracket 35 guiding the linkage rod 33. The stop bracket 35 is affixed in the central portion of the rigid rear axle 36, and preferably to the housing of the differential gearing. The upper end of the linkage 33 is connected to the switching member 32a of the pull switch 32, while the lower end of the linkage 33 is inserted into a hole in the flat spring 34 and carries a setscrew 38. This setscrew 38 is also fixed in a position such that an adequate idle path (dead stroke) is ensured for the vehicle during normal operation.

If, in the case of the practical embodiment illustrated in FIG. 4, the distance between the automobile body 31 and the rear axle 36 is increased to a degree that goes beyond that encountered during normal operation, then the linkage 33 actuates the pull switch 32 and its corresponding alarm after travelling along the aforesaid idle path. A further increase in the distance between the vehicle body and the rear axle is then flexibly taken up by the flat spring 34, which is deformed in the direction of the arrow 39, as indicated in dotted lines. With this special embodiment it should be ensured that the leaf spring 34 is designed sufficiently long to be able to take up any increases in the distance between the vehicle body and the rear axle that may occur.

The linkage 33 described in the last-mentioned embodiment of the invention could, of course, be replaced by a simple cable. Although it is generally preferred that an electrical pull switch be used on account of the more favourable arrangement, an electrical pressure switch can also be used to advantage in some cases.

With the anti-theft device according to the present invention it is also possible to combine the connecting member with the resilient member, with the resilient member incorporating several tension springs exhibiting differing tensile force. A tension spring having comparatively little tensile force can be employed, for example, to take up the idle path (dead motion) between the automobile body or chassis and the wheel carrier, while at least one other tension spring serves to trip the electric switch and takes up an additional increase in the intervening distance.

Figure 5:
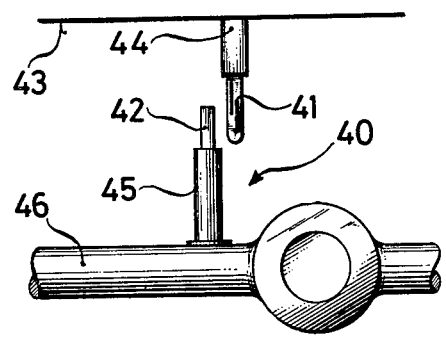
FIG. 5 is: a diagrammatic plan of a magnetic proximity switch embodiments of the invention.

In the case of the additional practical example illustrated diagrammatically in FIG. 5, the anti-theft device 40 incorporates a switch 41 in the form of a reed relay which is tripped by a movable magnet 42. The switch 41 is secured to the chassis or the automobile body 43 by means of a suitable mounting 44, while the movable actuating magnet 42 is attached to the axle tube 46 or a rigid rear axle by means of a holder 45.

When the vehicle is in its normal position, the switch 41 and actuating magnet 42 are relatively positioned approximately in the manner as illustrated in FIG. 5. Switch 41, for example, is kept open by magnetic force. Because the actuating magnet 42 is positioned laterally of the switch 41, sufficient dead motion is allowed for the vertical movements of the actuating magnet 42 which occur when the vehicle is travelling.

However, if the distance between the automobile body 43 and the axle tube 46 is increased to an unusual extent; for example, after the body has been raised for towing or in order to remove a wheel, then the actuating magnet 42 passes so far downwards with respect to switch 41 that this switch is tripped and closed. The alarm is then released.

Switch 41 can be designed as a normally closed or normally open switch.

I claim:

1. An anti-theft device for a vehicle that is movably mounted on wheel carriers, for securing the vehicle against theft of wheels and against unauthorized towing, comprising an alarm switch and an actuating member, one of which is mounted in a fixed position relative to the vehicle, and the other of which is mounted to move with one of said wheel carriers, a pre-loaded resilient member connecting the switch and the actuating member, the actuating member defining a lost motion limit to accommodate normal relative movement of said vehicle and said wheel carrier during travel of the vehicle without actuating the switch, and said switch being actuated through the pre-loaded resilient member by relative motion of said switch and said actuating member in excess of said lost motion limit when said vehicle is raised for towing or removal of a wheel, said resilient member being adapted to yield to accommodate relative movement of said vehicle and wheel carrier in excess of said relative motion needed to actuate the switch.

2. An anti-theft device according to claim 1, wherein the actuating member comprises a looped cable of adjustable length.

3. An anti-theft device according to claim 2, wherein the vehicle has a rigid axle that is surrounded by the looped cable adjacent to the middle of the axle, and the length of the loop is such as to accommodate normal relative movement of the vehicle and axle during travel of the vehicle.

4. An anti-theft device according to claim 2, wherein the vehicle has a single wheel suspension comprising a spring-mounted wheel carrier that is surrounded by the looped cable, and the length of the looped cable is such as to accommodate normal relative movement of the vehicle and wheel carrier during travel of the vehicle.

5. An anti-theft device according to claim 1, wherein the wheel carrier is connected to the vehicle by a shock absorber, and the actuating member is connected to the lower end of the shock absorber.

6. An anti-theft device for a vehicle that is movably mounted on wheel carriers, for securing the vehicle against theft of wheels and against unauthorized towing, comprising an alarm switch and an actuating member, one of which is mounted in a fixed position relative to the vehicle, and the other of which is mounted to move with one of said wheel carriers, said actuating member being arranged to actuate said switch, and having sufficient lost motion relative to said switch to accommodate normal relative movement of said vehicle and said wheel carrier during travel of the vehicle, and said switch being actuated by relative motion of said switch and said actuating member in excess of said lost motion when said vehicle is raised for towing or removal of a wheel, wherein a resilient flat spring is attached to the wheel carrier, and has a lost motion connection with a link which is connected to the switch.

* * * * *